(12) United States Patent
Macrae

(10) Patent No.: US 8,351,404 B2
(45) Date of Patent: Jan. 8, 2013

(54) METHOD AND APPARATUS FOR MULTIPLE ACCESSES TO A COMMUNICATIONS CHANNEL

(76) Inventor: Nigel Iain Stuart Macrae, Las Vegas, NV (US)

( * ) Notice: Subject to any disclaimer, the term of this patent is extended or adjusted under 35 U.S.C. 154(b) by 704 days.

(21) Appl. No.: 12/586,566

(22) Filed: Sep. 25, 2009

(65) Prior Publication Data

US 2011/0076953 A1    Mar. 31, 2011

(51) Int. Cl.
*H04B 7/00* (2006.01)
(52) U.S. Cl. ............................ 370/335; 455/59
(58) Field of Classification Search .................. 370/335
See application file for complete search history.

(56) References Cited

U.S. PATENT DOCUMENTS

| | | | |
|---|---|---|---|
| 2004/0246891 A1* | 12/2004 | Kay et al. | 370/215 |
| 2006/0049981 A1* | 3/2006 | Merkel et al. | 342/195 |
| 2006/0245417 A1* | 11/2006 | Conner et al. | 370/352 |
| 2009/0318178 A1* | 12/2009 | Nogami et al. | 455/517 |
| 2010/0110916 A1* | 5/2010 | Pratt et al. | 370/252 |

* cited by examiner

*Primary Examiner* — Sulaiman Nooristany

(57) ABSTRACT

A method and apparatus for increasing user capacity in a multi-user communication system. The method comprises transmitting a signal multiple times in the communication system with a predetermined delay between each retransmission. A receiver receives the signals and makes multiple delayed copies of the signal which are then summed. A second signal is then transmitted multiple times in the communication system with a different delay time between each retransmission than the first signal, and then received by a receiver which makes multiple delayed copies of this second signal which are then summed and decoded. This process is then used on subsequent signals in the communication system.

14 Claims, 5 Drawing Sheets

PDL REFERS TO 'PROGRAMMABLE DELAY LINE'

METHOD AND APPARATUS FOR MULTIPLE ACCESSES TO A COMMUNICATIONS CHANNEL

BACKGROUND OF THE INVENTION

1. Field of Invention

This invention relates to methods and apparatuses for transmitting signals, and more particularly to a method and apparatus where each transmitted signal is resent multiple times on the same frequency with a delay between each retransmission thus allowing for efficient use of a spectrum by the simultaneous use of one channel by various transmitters.

2. Description of Related Art

Heretofore a wide variety of methods and apparatuses have been proposed and implemented for transmitting multiple signals on the same frequency. One example is TDMA where each signal source is allocated a time interval on a frequency to transmit data. In this type of system, several sources use the same frequencies but are each allocated a unique time interval in which to transmit data. Another type of prior system is spread spectrum where, in one version the signal is simultaneously transmitted over several channels at once and summed together at the receiving end. Another example is CDMA which works by spreading a signal across a wide bandwidth using a spreading function. Each signal source uses a unique spreading function. The receive site uses the known spreading functions to decode each signal. Another system, Demand Assigned Multiple Access (DAMA) is used in satellite communications where a controller is used to assign a channel as needed for each transmitter to receiver communication.

The present invention is a unique and novel method with associated apparatus which allows multiple transmitters to simultaneously access the same channel at the same time. By allowing multiple transmitters to simultaneously access the same channel at the same time, increased and efficient use of the spectrum is achieved.

The present invention provides a method and apparatus for the more efficient transmission of data or voice signals in any given range of the electromagnetic spectrum, where each transmitted signal is resent multiple times on the same frequency with a delay between each retransmission. Multiple transmitters each transmit their repeated signals on the same channel at the same time. Any receiver can detect the desired transmission by making multiple copies of the incoming signal, delaying each copy by the reverse delay from the known delay set, and then summing the multiple time adjusted copies of the incoming signal. The method of the present invention is easily implemented and is highly efficient, effective, economical, and increases the use and potential of a data transmitting spectrum. It also allows multiple data signals to be transmitted on the same frequency.

Accordingly, it is the primary object of this invention to provide a method and apparatus for the simultaneous use of a channel in a communication spectrum by various transmitters where each transmitted signal may be resent multiple times on the same frequency with a unique preselected delay between each retransmission. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claim.

BRIEF SUMMARY OF THE INVENTION

The present invention is a method and an apparatus for increasing capacity in a communication system. The method comprises transmitting a signal multiple times in the communication system with a predetermined delay between each retransmission. The delays for each retransmission referenced to the first transmission of the data signal along with zero representing the first transmission form a set of delays herein called a delay set. A receiver receives the signals and makes multiple delayed copies of the signal using the known delay set, then recombines the signals. A second signal is then transmitted multiple times in the same frequency band with a different set of delays between each retransmission, and then received by a receiver which makes multiple delayed copies of this second signal using the second signal's delay set. This process is then used on subsequent signals in the communication system.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE INVENTION

Figure 1:
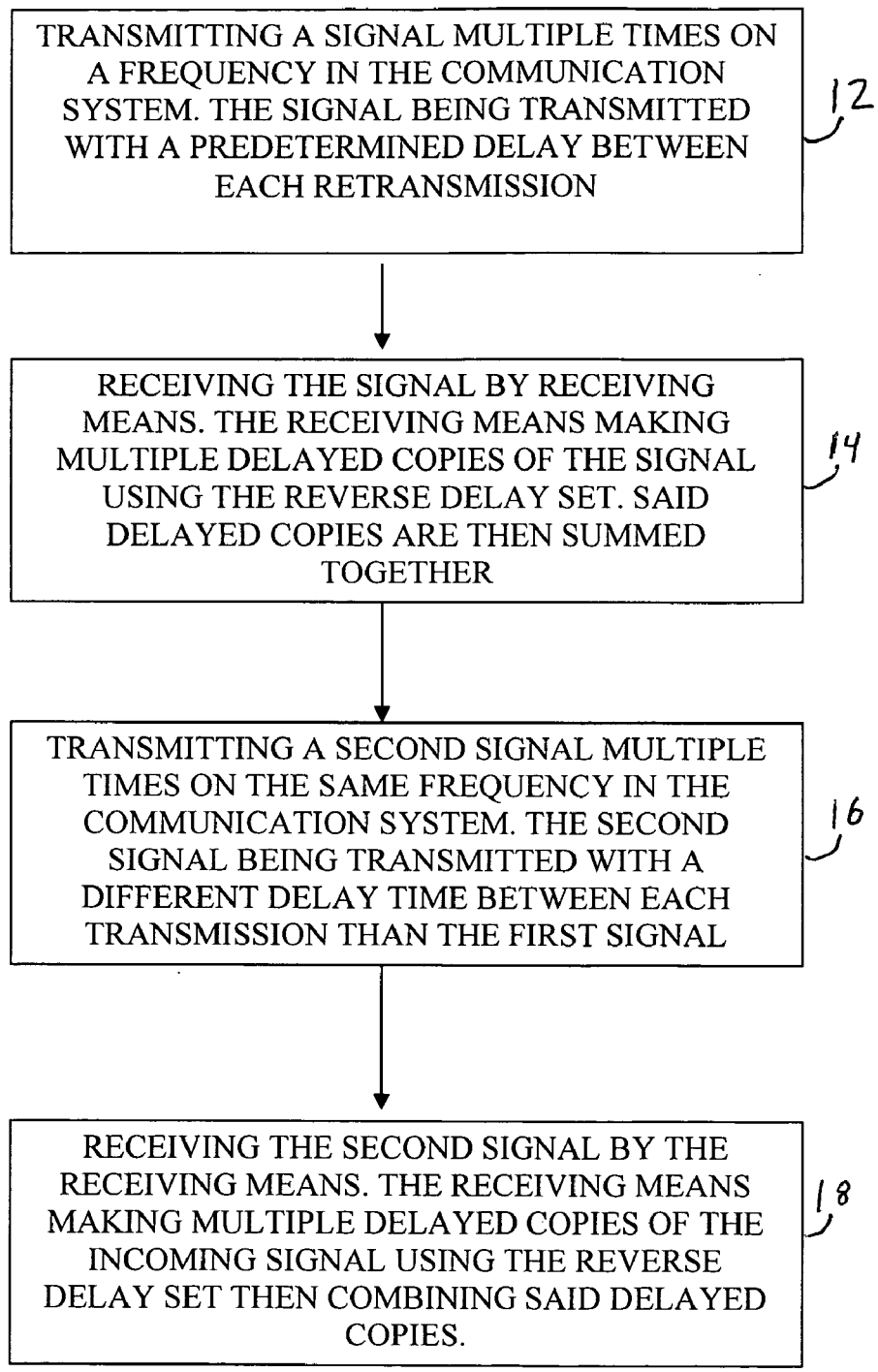
FIG. 1 is a flow chart showing the preferred method for increasing user capacity in a communication system, according to the invention.

Reference will now be made in detail to the present preferred embodiments of the invention as illustrated in the accompanying drawings.

In accordance with the present invention, there is provided a method and apparatus for increasing multiple access to an electromagnetic, i.e., radio, communication system. The method, in a preferred embodiment, is performed by transmitting from one transmitting station a data signal, repeating the same data signal multiple times on the same frequency with a different set of predetermined delays between each retransmission. Additional users also transmit their data signals on the same frequency with their own unique set of delays. At the receiving end, the signal is received by receiving means and multiple delayed copies are made of the data signal using the known set of delays for the desired signal, said copies are then summed together. The desired signal is enhanced by each copy being added, and the remaining data signals appear as noise. This allows multiple users to access the same frequency channel simultaneously.

Data signals occupy a band or range of frequencies referred to as a frequency band or channel. Each frequency band is a contiguous set of frequencies with a center frequency and multiple side frequencies. As used herein, the term "single frequency" refers to a frequency band having a center frequency and multiple side frequencies. Two signals being of the "same frequency" means that least one of the frequencies used to transmit a data signal is the same for both signals, i.e., that at least part of the band of frequencies overlaps. In this disclosure two data signals occupying the same frequency may include either exactly the same bands or partly overlapping bands.

Accordingly, using the present methodology, each transmitted data signal is resent multiple times on the same frequency with a delay between each retransmission. The data signal may be digital or analog. The signal may be repeated with the same delay between each repetition, or alternatively, the signal may be repeated at varying intervals. Each data signal must have its own unique pattern of delays. For example, the first data signal may be transmitted at 0, 1, 3, 11, 27 and 31 milliseconds apart. The delays for a group of repeated signals in relationship to the first transmission, including 0 for the first transmission, are referred herein as a delay set. Accordingly, the intervals for the above signal would be the delay set for signal one.

The term "data signal" refers to an electromagnetic signal containing encoded information. The encoding can be any of many known systems such as QPSK, QAM, FM, AM, 16PSK, and so on.

The data signals are transmitted to a receiver which makes multiple copies of the signal. Each copy is delayed by M minus each element of the delay set where M is greater than or equal to the longest delay in the set. In the above example, the reverse delay set is 0, 4, 20, 28, 30 and 31 milliseconds, where M=31. M could be a larger number. These delayed copies are then summed together at the receiver enabling detection of the incoming signals. The selected signal or signals are enhanced by this summation, and all undesired signals appear as noise. Error correcting codes can be added before transmission to allow for correction of any received errors. If the error codes in the incoming signals indicate too high of an error rate, more copies of the incoming signal can be transmitted and decoded, or the bit rate can be reduced. The number of repeated copies can be handled dynamically, depending on power levels and error rates.

The second signal will simultaneously be transmitted with a different delay set than the first signal, e.g. 0, 5, 7, 13, 39, 47 milliseconds. As with the first signal, multiple copies of the second signal are transmitted with each delay specified by its delay set. The signal can be detected by delaying and summing together the received signals as explained for the first signal, using, for example, the reverse delay set (N−Di) where Di represents each member of the delay set for the second transmission, and N is greater than the longest delay.

The same methodology is repeated for each additional transmitted signal.

The selection of the delay set for any given signal is important. What is important are the times between each of the elements Δt of a delay set and the Δts of every other delay set. A set of 10 elements would generate 90 possible Δt's. This is the delay between one element of the first delay set and each of the other nine elements (9) times the number of elements (10). Although any delay set may use the same delays between each element in the set, the Δt's between two different delay sets need to be different. If two Δt from two different delay sets are the same, then when delaying and combining the signals from one delay set that are a specified Δt apart, the two copies with the same delay from the second signal will also sum causing an increase in the unwanted signal. This should be avoided.

Secondly, when the data signal is repeated at radio frequency (RF) or intermediate frequency (IF) the delays should be a multiple of 1/frequency of the carrier the data signal is combined with, so that when the carrier is being decoded at reception the carrier sums as well as the desired data signal. This makes it easier to down convert the signal for reception and decoding.

The receiving side is enabled to know or determine the delay set for each signal by several possible techniques. The delay set can be selected and programmed into both the transmitter and receiver so that the set is known and recognized by both. Alternatively, if the transmitter uses a delay set from a known list of possible delay sets the receiver can evaluate the signal until the correct delay set is found. Alternatively, a tag identifying the delay set, or the delay set itself can be transmitted so that both ends know the delay set.

In FIG. 1, the method for increasing user capacity in a communications system 10 is shown according to a preferred embodiment of the invention. Preferably, a signal is transmitted multiple times 12, on a frequency in the radio communication system. The signal is retransmitted through transmitter 20, seen in FIG. 2, with predetermined delays between each retransmission.

Figure 3:
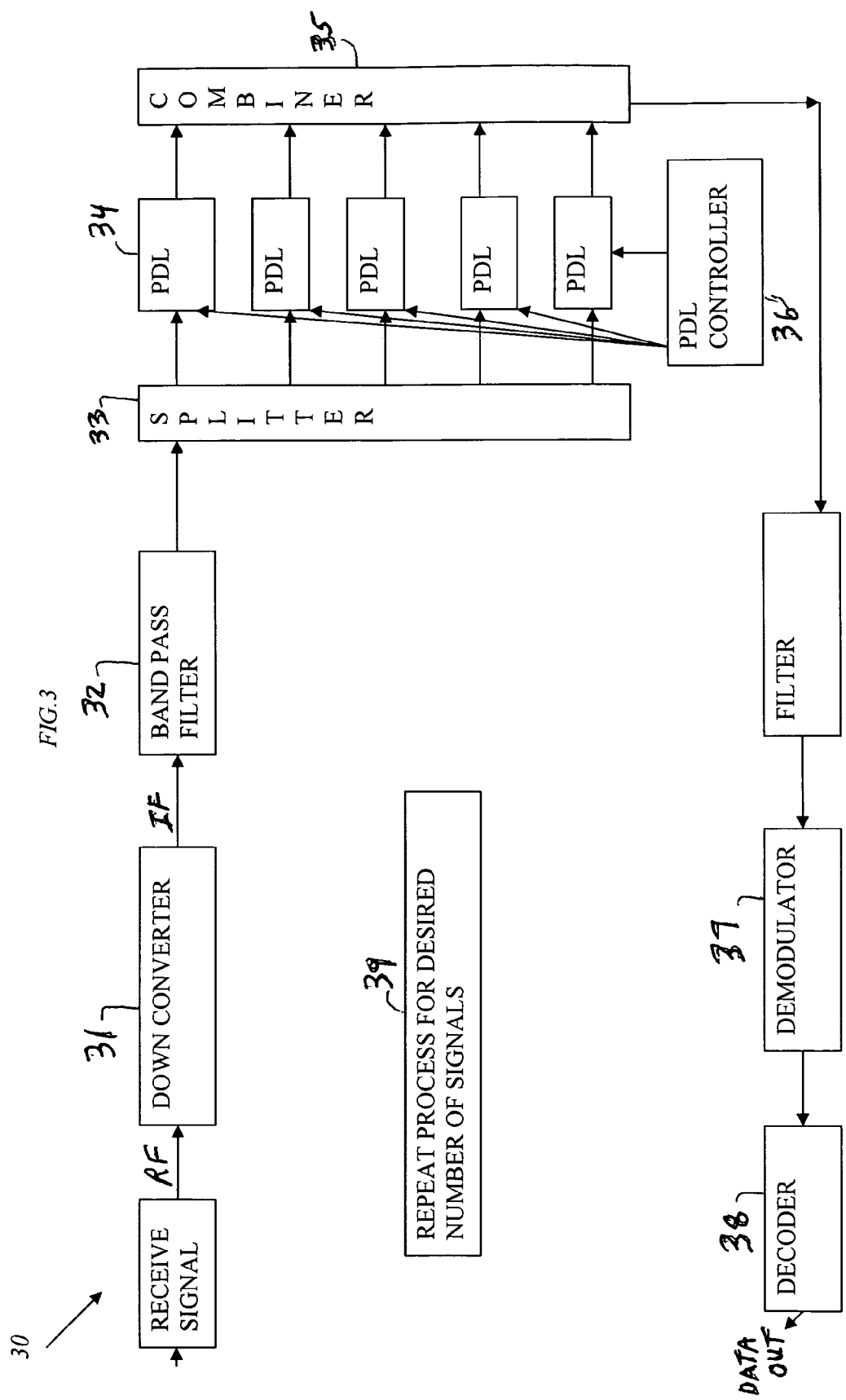
FIG. 3 is a schematic representation of the receive side of such method and apparatus, according to the invention

Next the signal is received by receiving means 14, such as receiver 30, seen in FIG. 3. Receiver 30 makes delayed copies of the signal using the reverse delay set, sums them together, and then demodulates and decodes them.

When the next or second signal is to be transmitted, the second signal is transmitted multiple times 16, on the same frequency in the communication system. The second signal is transmitted with a different delay set from the first signal.

Figure 4:
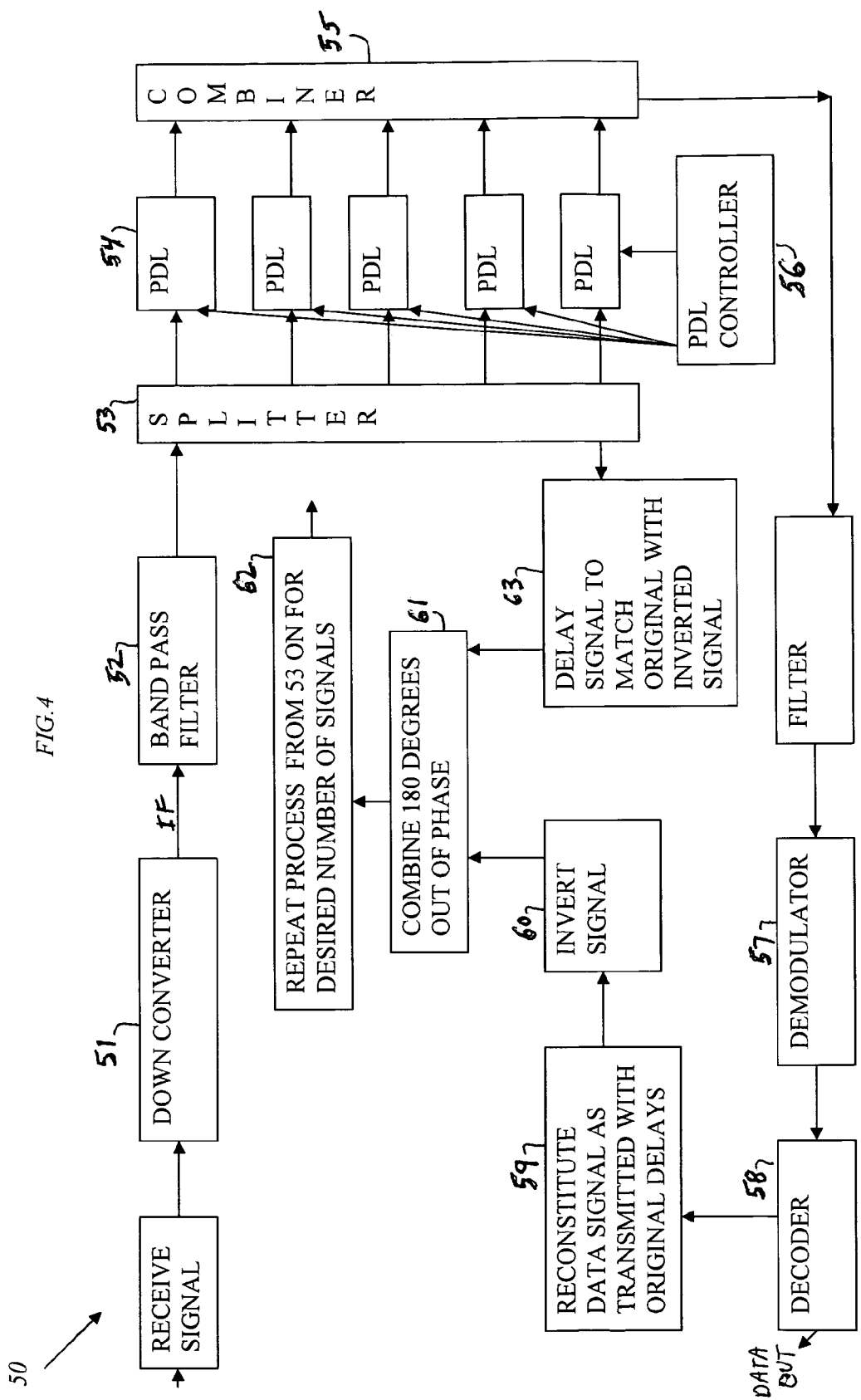
FIG. 4 is schematic representation of another embodiment of the receive side of such method and apparatus, according to the invention

The second signal is then received 18, by receiving means such as receiver 30, in FIG. 3 or receiver 50, in FIG. 4. The receiving means making multiple delayed copies of the second data signal using the reverse delay set. This same sequence of events is repeated for every subsequent data signal, and may be used with a single signal or a plurality of signals. Preferably, these data signals are delayed using the reverse delay set and are summed together at the receiver, whereby, undesired signals appear as noise at the receiver and desired signals are enhanced.

If error detection means, described in greater detail below, detect a high level of errors in the transmission of the signal or signals, more copies of the signal are then transmitted to the receiver, or the power can be increased for that signal.

Using the method of the present invention, the signal being transmitted within the communications system is repeated multiple times using a known set of delays. There are many ways for receiver 20, to be configured so as to determine the set of delays. For example, the transmitter may be assigned a delay set and always use the same set which is also known by the receiver. Alternatively, there may be some communication between the transmitter 20, and receiver 30, as to what the delay set is. This can be in-band in the form of a repeating sequence broadcast until identified, 'handshaking' using a separate channel, or other techniques well known in the art. As a security measure, the delay set can be changed on a continual basis based on a schedule where both units change at the same time but with a delay set chosen by a calculation performed by both the transmitter and receiver or by a preset schedule.

In one embodiment the number of sets of delays used to transmit a message or messages are selected to be finite and relatively small, there may be a hundred terminals intermittently transmitting on the same channel each with its own assigned and known delay set. Under such circumstances, it is possible to continually monitor all delay sets to see which have been used at any time and process these signals as they come in.

Any transmitter can communicate with any receiver so long as the receiver knows or can detect the delay set used by the transmitter. This is particularly useful in satellite communications systems where any user may want to communicate directly with any other user rather than going through a hub station.

Figure 2:
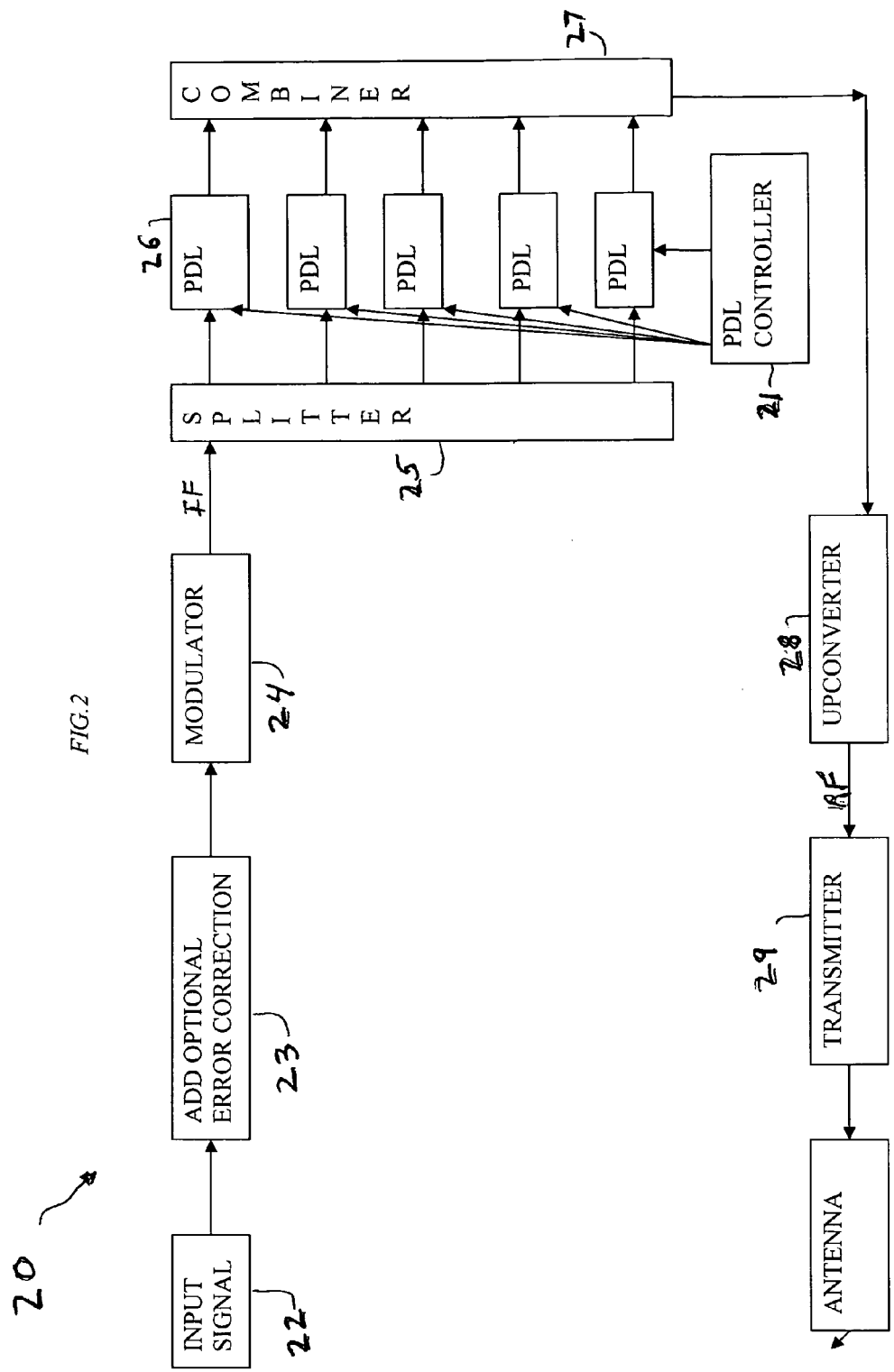
FIG. 2 is a schematic representation of the transmit side of such method and apparatus, according to the invention

With reference now to FIG. 2, a signal 22, in a communications system, either digital or analog, is to be transmitted. First, any required error correcting codes are added 23, to the digital signal. Signal 22 is then modulated at modulator 24, by any of a number of widely known means, such as FM, spread spectrum, qpsk, msk, 8 psk, 16QAM and the like. Once the carrier is modulated it can be repeated at either baseband, intermediate frequency or at a transmit frequency. In the present example, the signal is repeated at an intermediate frequency (IF) such as 950 to 1450 MHz. To repeat the signal, the signal is preferably split at splitter 25, for example, into eight copies of the same signal. This would correspond to delay sets with eight members. Each copy is then fed into a programmable delay line (PDL) 26. PDL system controller 21, instructs each delay line 26, how long to delay the incoming signal.

After each copy of the signal is delayed by the specified element of the delay set, the copies are then recombined at combiner 27, filtered for harmonics, and unconverted at upconverter 28, to the desired transmit frequency, and then amplified at transmitter 29, for transmission. The same process described in FIG. 2 is used for each transmitted data signal.

The method of this invention may be used in numerous wireless applications, such as multiple accesses to satellite transponders, wireless data and voice transmission, and the like.

In FIG. 3, receiver 30, is shown which receives the transmitted signal which may be a collection of many signals transmitted from different sources and down-converts 31 the signal to an intermediate frequency (IF). In satellite communications, this might be somewhere in the 950-1450 MHz range, for example. Then the signal is passed through a band pass filter 32, to eliminate all out of band signals. The filtered signal is split at splitter 33, n times where n is the number of elements of the delay set for that desired signal. In this example n=5. Each copy of the signal is delayed by each programmable delay line (PDL 34) using one member of the calculated delay set (M–Di) where i goes from 1 to 5, corresponding to the n=5 members of the delay set for the desired signal and M is at least as long as the longest element of the set. The PDL controller 36 calculates and programs each delay line for the desired delay. If necessary, the delays may be corrected for Doppler shift and other unwanted propagation delays within the system.

Then the delayed copies of the signal are recombined into a single signal using combiner 35. By this process each delayed copy of the signal is summed with the rest of the delayed copies. Undesired signals with different delay sets look like noise and tend to cancel each other out, and the desired signal will be enhanced. The combined signal is then further demodulated at demodulator 37, detected, and decoded at decoder 38, and error corrected if necessary. The process may be repeated in 39, for any number of data signals and their corresponding delay sets as desired. If the receiver is to decode data from several transmitters, this same method may be run in parallel on several copies of the incoming signal.

In FIG. 4 an alternative receiving means 50, is shown. A signal or signals are down converted by converter 51, to an intermediate frequency (IF), and is passed to bandpass filter 52, split in splitter 53, through programmable delay line 54, and then to combiner 55. PDL controller 56 is used to calculate and program each desired delay. The delayed copies of the signal are then summed in combiner 55, and demodulated at demodulator 57. Decoding of the signal is carried out at decoder 58. The first data signal is recovered in this way. In this alternative system, after the first selected signal is corrected the detected signal can be remodulated using its original delay set and reconstituted 59 by combining the multiple delayed copies, to appear as it did in the originally transmitted signal. The reconstituted signal can be subtracted from the original incoming signal to form a signal which has had the first data signals removed. This reduced signal can then be processed as in 53 through 58 for a different data signal. This reduction loop can be repeated again for each remaining data signal. This reduction loop technique of iteratively removing signals from the original signal is called adaptive canceling and is used in astronomy and satellite communications designs.

The order in which signals are processed can be set so that the more easily detected signals are processed first, that is, from higher power to lower power or less errors detected to more errors detected. In general, the best signal detected is the first decoded and the weakest signal is the last decoded, after all of the other signals are filtered out.

In another embodiment, rather than continuous transmission of each copy of the data signal, the transmitter can transmit each of the delayed copies of the data signal in a burst mode. Each copy is transmitted in a short burst, with each subsequent copy being delayed until the previous copy has completed transmission. This allows reduced power usage. At the receive end, each of the copies is delayed until all of the copies are aligned. Then they are summed together. The same process is then repeated for the next data burst.

Figure 5:
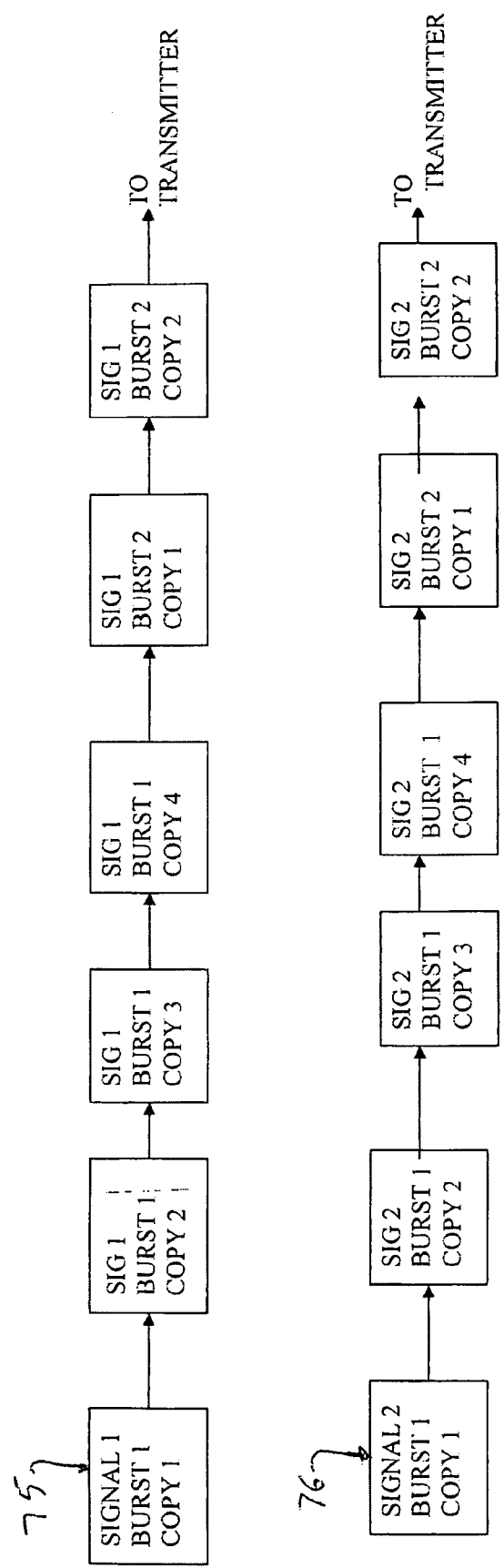
FIG. 5 is a representation of repeating bursts of the same signal on a single frequency, followed by repeats of the next burst.

FIG. 5 is a representation of transmitting each signal in burst mode. The data from each signal is condensed and packaged into one group of data transmitted in burst mode. The exact same signal is resent several times in succession on the same frequency 75. Once all of the copies of the first packet have been sent, the next packet is sent several times, and so on. Other transmitters send burst or continuous repeated signals on the same frequency 76. Each transmitter will use a time delay between packets that is unique to that transmitter so that when the signals combine using the known delay set, the undesired other signals do not sum together.

In order to detect the desired signal, the receive signal is divided into the number of copies of the same burst. The copies are then aligned so that the each copy of the same burst can be summed by combining with each other. The remaining signals cancel out and appear as noise. The signal is then detected as it would normally be.

As is evident from the above description, additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept

What is claimed is:

1. A method for multiple transmitter access to an electromagnetic communication system, comprising:

transmitting a first data signal repeated multiple times on a frequency in said communication system, said data signal being transmitted with a first predetermined set of delays between each retransmission;

receiving said first data signal by a receiving means, said receiving means splitting said received first data signal into multiple copies, said copies delayed using a reverse of said predetermined first set of delays, said delayed copies of said received first data signal combined together;

transmitting a second data signal multiple times on said same frequency in said communication system, said second data signal being transmitted with a second predetermined set of delays, wherein said second data signal is different than said first data signal; and receiving said second data signal, by said receiving means, said receiving means splitting said received second data signal into multiple copies, said copies delayed using the reverse of said predetermined second set of delays, said delayed copies of said received second data signal combined together; and wherein said first predetermined set of delays and said second predetermined set of delays are unique to each other, and wherein said first predetermined set of delays and said second predetermined set of delays do not have identical timing intervals between retransmissions that are identical between two delay sets.

2. The method of claim 1, wherein a plurality of signals are transmitted multiple times over a frequency in said communication system, each of said plurality of signals having a delay time between each transmission different from any other retransmitted signal.

3. The method of claim 1, wherein said plurality of signals which are transmitted multiple times in said communication system and are each summed at said receiving means.

4. The method of claim 1 wherein the multiple delayed copies of the data signal are combined at an intermediate frequency before transmission and then upconverted to the final transmission frequency; then at the receive end the received signal is down converted to an intermediate signal then copied and delayed using the known delay set, then the copies are combined.

5. The method of claim 1, wherein said delayed copies of said signal are also transmitted on different frequencies in said communication system.

6. The method of claim 1, wherein if an error detection means in said receiving means detects a high level of errors in transmission of said signal, more copies of said signal are transmitted to said receiving means.

7. The method of claim 1, wherein if an error detection means in said receiving means detects a high level of errors in transmission of said signal, the data rate of the transmitted signal is reduced.

8. The method of claim 1, wherein if an error detection means in said receiving means detects a high level of errors in transmission of said signal, the power at which the signal and its copies are transmitted is increased.

9. The method of claim 1 used in a satellite communications network.

10. The method of claim 1 wherein the signal is transmitted in a burst mode, wherein each copy of the signal has a finite duration, wherein each copy is delayed before transmission until the burst transmission of the previous copy is completed.

11. The method of claim 10 where upon reception each burst is delayed until they are all time aligned, and then summed.

12. The method of claim 1 wherein both the transmitter and the receiver use a mutually known delay set.

13. The method of claim 1 wherein the delay set is communicated from the transmit station to the receive station.

14. The method of claim 1 wherein the delay set is communicated from the receive station to the transmit station.

* * * * *